United States Patent Office 3,794,551
Patented Feb. 26, 1974

3,794,551
PRECOMPRESSED CERAMIC FOR LIGHT ARMOR
Richard L. Landingham, Livermore, and Carl F. Cline, Walnut Creek, Calif., assignors to the United States of America as represented by the Secretary of the Army
No Drawing. Filed Feb. 7, 1972, Ser. No. 224,243
Int. Cl. B32b 5/12
U.S. Cl. 161—58
4 Claims

ABSTRACT OF THE DISCLOSURE

A precompressed ceramic sheet material suitable for use in light personal armor applications, and processes for the formation thereof. A fine wire metallic network is embedded in a matrix of ceramic material and heated to an elevated temperature. Upon cooling, the thermal contraction differences between the fine wire and the ceramic matrix compressively stresses the ceramic matrix to greatly increase the fracture resistance and strength of the ceramic sheet material.

---

This invention relates to precompressed ceramic sheet material and method for formation thereof.

Light personal armor is primarily fiber glass laminates in which glass fiber material is embedded, e.g., a conventional motorcycle helmet. However, such laminate structures have a minimal multi-hit integrity because the crystal lattice of the laminate plastic resin fractures when severely shocked. Consequently, the armor material may stop an initial projectile, but a second projectile will penetrate.

The present invention relates to strengthened ceramic material having multi-hit integrity, suitable for utilization as a lightweight armor. There are many techniques for treating a ceramic sheet in order to induce compressive stresses into the ceramic matrix, e.g., preferential quenching; graduated sintering through the thickness of the sheet, and altering the composition of the ceramic matrix for varying lattice spacing. The present invention utilizes a network of metal wires, which may be meshed or linked, embedded in a ceramic matrix structure in the shape of the ceramic material. The wire network is held in tension for compressively stressing the ceramic in order to harden and strengthen the material.

It is an object of the invention to provide and disclose an improved lightweight armor material comprising a metallic network embedded in a ceramic matrix.

It is a further object of the invention to provide and disclose an improved lightweight armor material comprising a metallic network embedded in a ceramic matrix, wherein the metallic component has relatively large thermal contractive properties in comparison to the ceramic component.

It is a further object of the invention to provide and disclose an improved lightweight armor material comprising a metallic network embedded in a ceramic matrix whereupon during cooling in the formation of the armor, the differential thermal contraction rate of the metallic network and the ceramic component exerts a compressive stress on the ceramic matrix thereby increasing the strength of the material.

Other objects and a fuller understanding of the invention may be ascertained from the following description and claims.

An exemplary material was prepared by placing a layer of tetra beryllium boride in a 3″ standard ram and die hot-press. A 200 mesh copper screen (40 micron diameter wires) having a configuration analogous to the die, is positioned on top of the layer of tetra beryllium boride powder. A second layer of tetra beryllium boride powder is positioned on top of the wire screen. The material was hot-pressed in an argon atmosphere for 8 minutes at a temperature of 1030° C. under 5000 p.s.i. A heating rate 20° C./min. was utilized. The material was cooled at the rate of 10°/min. and a compact of around 3″ in diameter having a thickness of about 0.32″ was obtained. In addition to hot-pressing, the present material may be prepared by plasma-spraying or vapor depositing a ceramic material onto a metallic network at an elevated temperature thereby forming a ceramic matrix embedding and bonding to the metallic network.

Essentially, the process utilizes differential thermal contraction rates between a fine wire network and a bonded ceramic matrix for implementing the compressive stress on the ceramic matrix. The selected metal wire has relatively large thermal contractive properties in comparison to the ceramic material; consequently, as the finished ceramic sheet cools, the differential thermal contraction rate of the ceramic matrix and the wire network exerts a compressive stress on the ceramic matrix thereby strengthening the material.

In addition to copper, exemplary metallic constituents include a copper alloy containing 3% beryllium; and beryllium. In addition to tetra beryllium boride, di-beryllium boride may be utilized in combination with the above metals. However, it is pointed out that the invention is not limited to the above components in that any combination may be utilized wherein there is differential thermal contraction rate between the metallic component and the ceramic.

Although we have described our invention with a certain degree of particularity, it is understood that the present disclosure has been made by way of example and that various metallic configurations may be utilized in combination with the ceramic without departing from the spirit and scope of the invention.

Having described our invention, we claim:

1. A precompressed armor material comprising a beryllium boride ceramic matrix having a metallic wire network embedded therein, the metallic component having relatively large thermal contractive properties in comparison to said beryllium boride ceramic, thereby exerting a compressive stress on said ceramic matrix and strengthening said armor material; said metallic component being selected from the group consisting of copper, copper-beryllium alloy, and beryllium.

2. A material in accordance with claim 1 wherein the ceramic is selected from the group consisting of tetra beryllium boride and diberyllium boride.

3. A material in accordance with claim 1 wherein the ceramic component is tetra beryllium boride and the metal component is copper.

4. A material in accordance with claim 3 where the metallic component comprises a 200 mesh screen.

References Cited

UNITED STATES PATENTS

| | | | |
|---|---|---|---|
| 3,607,608 | 9/1971 | Siefert | 161—170 |
| 3,633,520 | 1/1972 | Stiglich Jr. | 109—82 |
| 3,689,614 | 9/1972 | Bortz et al. | 264—60 |
| 3,713,877 | 1/1973 | Kirchner et al. | 117—123 A |

CHARLES E. VAN HORN, Primary Examiner

U.S. Cl. X.R.

161—89, 404; 264—60; 156—89; 109—81